Feb. 25, 1969  P. C. MOONEY  3,429,543

INSTRUMENT MOUNT

Filed March 23, 1967

INVENTOR.
PAUL C. MOONEY

BY *Holgren, Wegner, Allen, Stellman & McCord.*

ATTORNEYS.

United States Patent Office 3,429,543
Patented Feb. 25, 1969

3,429,543
INSTRUMENT MOUNT
Paul C. Mooney, Northbrook, Ill., assignor to Quick-Set, Incorporated, a corporation of Illinois
Filed Mar. 23, 1967, Ser. No. 625,342
U.S. Cl. 248—346   4 Claims
Int. Cl. A47g *29/00;* F16m *1/00*

ABSTRACT OF THE DISCLOSURE

An improved instrument mounting assembly having a first part constructed and arranged for semi-permanent installation on a mounting surface and a second part constructed for securement to a sighting or photographic instrument, the first and second parts further having mutually engageable portions for rapidly and accurately releasably fixing the second part and its associated photographic or sighting instrument to the first part to provide a stable mounting surface for the sighting or photographic instrument.

BACKGROUND OF THE INVENTION

Field of the invention

This invention relates to a photographic equipment mounting assembly and more particularly to an assembly having a portion arranged for attachment to photographic equipment and another portion arranged for attachment to a mounting surface, the two portions being constructed and arranged for locking engagement to accurately and rapidly mount photographic equipment to a mounting surface.

Description of the prior art

In the art of professional and highly skilled amateur photography, as well as in the field of television, sophisticated camera equipment is used in a variety of locations. For example, camera equipment may be used in laboratory conditions, in field conditions, and in studio conditions, all of which would necessitate a different type of mounting or supporting base for the camera. For such sophisticated work, it is desirable to be able to transport a camera between several locations and yet to be able to accurately position the camera upon a supporting base at each location. At present such accurate positioning can be a bothersome and time-consuming chore in that it may involve the use of separate fastening elements for attaching the camera to a mounting surface and subsequent necessary adjustments to assure the proper orientation of the camera relative to the mount.

Summary of the invention

This invention is directed, in brief, to the provision of an improved mounting assembly for sighting equipment comprising a two-part structure, one of which is intended for securement to the underside of a sighting instrument and the other of which is intended for securement to the top of a supporting surface. The two parts have mutually engageable side wall surfaces including opposed upstanding walls and opposed mating dovetail surfaces to prevent relative movement of one part to the other one in the assembled condition. The base is provided with a movable locking member urged by an eccentrically positioned, spring urged lever which abuts the locking member so that the movement of the lever causes to and fro movement in the locking member to lock and release the two parts.

Brief description of the drawing

Other objects, features and advantages of the present invention will be apparent from the following description of the preferred embodiments illustrated in the accompanying drawings, in which:

FIGURE 5 is a fragmentary sectional view similar to FIGURE 3 of an alternate pivot mount for the block member.

Description of the preferred embodiment

Figure 1:
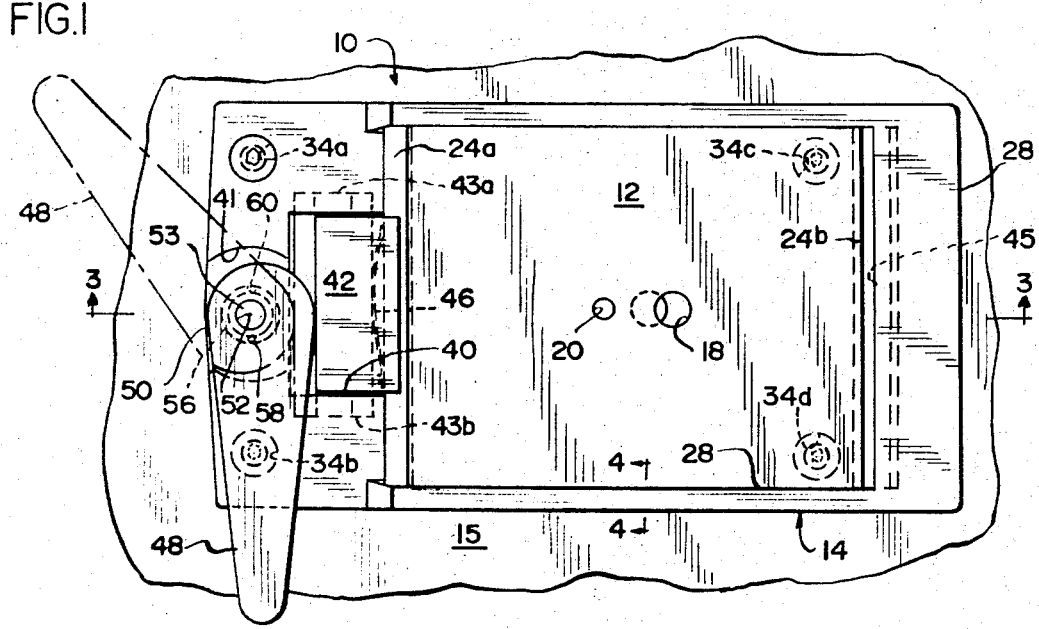
FIGURE 1 is a top plan view of the mounting assembly of this invention.
Figure 3:
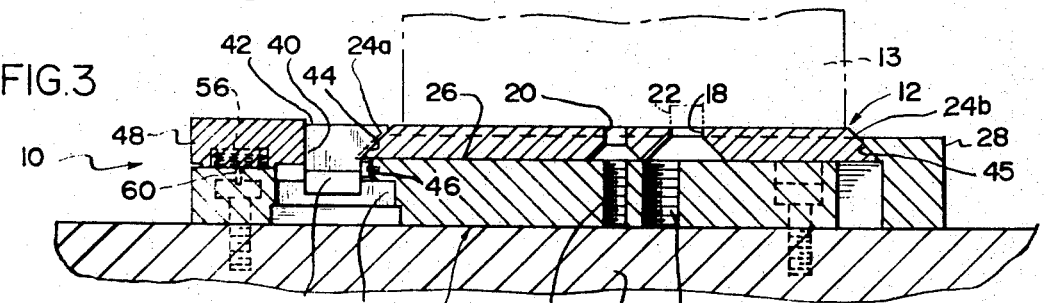
FIGURE 3 is a section view taken generally along the line 3—3 of FIGURE 1.

The mounting assembly 10 of this invention includes a first member or plate 12 which is intended to be attached to, and carried by, a camera-like instrument 13, such as a photographic or television camera; and a second member or base 14 which is intended to be mounted on a surface 15 for supporting a camera. Both the plate 12 and base 14 are made from a material which is sufficiently sturdy and durable to withstand the wear and abuse to which camera mounting equipment may be subjected. In the preferred embodiment, these two parts are made of aluminum.

Plate 12 has a generally flat central face 16 which includes means for mounting the plate to appropriate camera equipment. In the preferred embodiment, this means takes the form of openings 18 and 20 which are clearance openings of different sizes for receiving ¼" and ⅜" mounting screws, respectively, such as screws 22. Most cameras have a threaded opening in the underside for receiving the threaded shank of one of either a ¼" or ⅜" mounting screw. Therefore, the provision of two clearance openings in plate 12 for receiving either of these screws provides a means for threadably attaching plate 12 directly to the underside of a camera.

As will be explained later, for the purpose of connecting the plate 12 to the base 14, the opposite ends of the plate are provided with outwardly and downwardly etxending opposed skirt portions or dovetail portions 24a and 24b. The opposite sides of the plate are each provided with a downwardly and inwardly tapering draft 25a which terminates short of the top of the plate in the straight sides 25b in accordance with good casting practice.

The mounting base has a centrally located relieved body portion 26 provided with an upraised generally U-shaped flange or border 28. Means are provided in the body portion 26 for mounting the base to standard photographic instrument supporting elements. In the preferred embodiment, this means takes the form of openings 30 and 32 which are threaded to receive ¼" and ⅜" screws, respectively. Standard photographic instrument supports, such as tripods and the like, are usually provided with either a ¼" or ⅜" screw. Thus by threading either screw through the appropriate opening 30 or 32, respectively, the base may be mounted to such supports.

In addition, countersunk holes 34a, 34b, 34c and 34d are provided near the corners of body portion 26. Suitable fastening means may be inserted in these holes to mount base 14 for permanent attachment to other supporting surfaces, if desired.

One end of base 14 is provided with a through opening 36 including a first enlarged portion 38 which opens through the bottom of base 14 and a second reduced portion 40 which opens through the top of the base. A sliding block or clamping member 42 is positioned in recess 36. The lower portion of the block includes laterally offset shoulders 43a and 43b which occupy the laterally enlarged area of portion 38. The block 42 is narrower in a forward to rear dimension than opening 36 so that the block may be moved forwardly and rearwardly with respect to the opening and with respect to the base 14.

Block 42 has a dove-tail front surface 44 for mating with, and normally engaging, the dove-tail skirt 24a of one end of plate 12 to hold the plate in the base when the plate has been mounted therein with the other dove-tail skirt 24b in general mating juxtaposition with the opposite dove-tail surface 45 of flange 28. A leaf spring 46 is positioned in recess 38 and bears against block 42 to normally urge the block 42 rearwardly or to an unlocked position.

A lever 48 has an enlarged hub portion 50 which fits within a recess portion 41 centrally located beside the sliding block. The lever has an eccentrically located pivot bore 52 through which pin 53 extends into the base member 14 to pivotally mount the lever with respect to the base. The lever engages the block as shown and swinging of the lever through a 180° arc will cause lateral displacement of the sliding block member 42 between a fully retracted position and a plate clamping or locking position. When the lever is moved so that the short side of the eccentric is adjacent the sliding block, the sliding block automatically retracts to the fully retracted position due to the action of spring 46.

Means are provided for mounting the lever so that it normally forces the sliding block to the locking or clamping position. For this purpose, a torsion spring 56 is connected at one end 58 to the lever and at the other end 60 to the base member 12. The force of the torsion spring is substantially stronger than the force of spring 46 and normally holds the lever so that the enlarged side of the eccentric abuts block 42 and therefore normally pushes block 42 to the fully clamped, or locking position.

Figure 4:
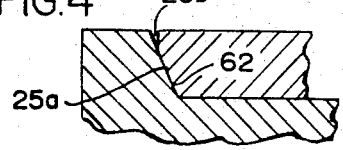
FIGURE 4 is a fragmentary enlarged sectional view taken along the line 4—4 of FIGURE 1.
Figure 2:
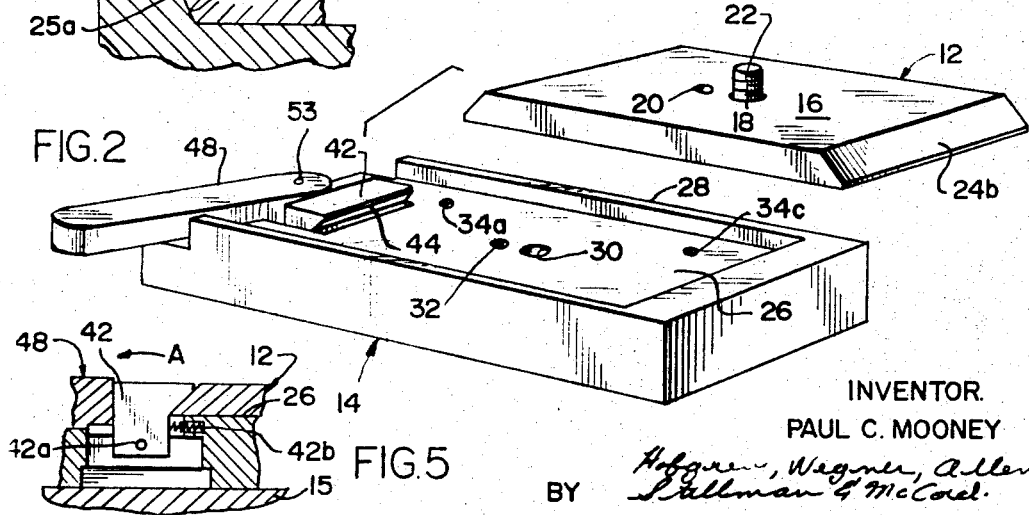
FIGURE 2 is an isometric exploding view of the mounting assembly of this invention.

The interior of each of the opposite side walls of base flange 28 may be generally upright or provided with a downwardly and inwardly tapered drafted surface 62 which generally mates with the drafted sides 25a of the plate, as shown in FIGURE 4. When the plate and base are assembled, the base dovetail surfaces 44 and 45 force the plate downwardly and hold the plate against relative longitudinal movement as well as preventing relative vertical movement between the two parts. Also, the downward force imposed by surfaces 44 and 45 urges the surfaces 25a and 62 tightly together firmly holding the plate against lateral movement relative to the base whether these surfaces are drafted, as shown in the drawings, or generally upright.

In operation, when it is desired to mount a camera having the plate 12 secured thereto, to a supporting surface bearing the base 14, the lever is swung in opposition to the torsion spring so that the spring 46 may urge the block to the retracted position. Plate 12 is then inserted into relieved portion 26 with the dove-tail skirt 24b of the plate underlying the dove-tail surface 45 of the flange 28 and side wall 25a abutting the base side wall 62. The camera is then locked onto the base by merely releasing lever 48 which permits the torsion spring 56 to return the lever to its normal position, urging the sliding block into the fully locked position with dove-tail surface 44 of the block engaging dove-tail surface 24a of the plate locking the plate against movement in three dimensions relative to the base.

The mounting assembly described herein provides a means for quickly and firmly securing a photographic instrument to a supporting surface to which the base member is attached, yet further permits a rapid dismounting of the photographic instrument relative to the base. The components of the assembly are both easily manufactured and easily manipulated. The relative simplicity of the component parts of the assembly and the ease of operation thereof further enhances the reliability of the assembly.

The instrument mount of this invention has been described for use particularly with a photographic instrument such as a camera. However, this mount can be used for supporting other instruments in general, such as in the field of optics and radiation pyrometry or optical metrology. In addition, television cameras and radar and telescopic instruments can be supported on the mount and surveying equipment or cameras which use laser beams for surveying or measuring distance.

An alternate pivot mount for the block 42 is shown in FIGURE 5. Instead of being provided with the ears 43a and 43b, a pin 42a extends out of the opposite sides of block 42 and is fixed in the base 14 and loosely fitted into the block so that the block is free to pivot relative to the pin 42a. A coil compression spring 42b is interposed between the base 14 and the underside of block 42 so that when the lever 48 is swung to the dotted line position shown in FIGURE 1, the force of spring 42b will pivot block 42 in the direction shown by the arrow "A" in FIGURE 5 to permit release of plate 12.

The foregoing detailed description has been given for clearness of understanding only, and no unnecessary limitations should be understood therefrom, as some modifications may be obvious to those skilled in the art.

I claim:

1. A mounting assembly for releasably mounting an instrument to a supporting surface comprising: a plate having opposed depending side walls and a top and bottom face, means in the plate for securement of the top of the plate adjacent the underside of an instrument with the opposed side walls of the plate projecting therefrom; a base having a top and bottom with means on the base for securement of the bottom to a supporting surface, upwardly extending border means on said base of a size and shape to closely embrace the opposed sides of the plate, said border means being interrupted by an opening therein; a locking member having a front and rear and being mounted on the top of the base adjacent the border opening for movement toward the border opening to a locking position and away from the border opening to a release position; the enclosure defined when the locking member is in the locking position being of a size and shape to confine the plate against relative movement therein; releasable urging means on the base adjacent the locking member for normally urging the locking member towards the opening and into said locking position, said urging means including a lever member normally in abutment with the rear of the locking member and movably mounted on the base; the lever member having a progressively enlarged surface facing in the direction of movement of the lever member so that movement of the lever member causes displacement of the locking member; and means normally urging the lever member in the direction of the progressively enlarged surface.

2. The mounting assembly of claim 1 wherein the plate side walls have opposed outwardly projecting portions and the base border has generally mating inwardly directed portions for confining the plate against movement relative to the base when the locking member is in the locking position.

3. The mounting assembly of claim 1 wherein a spring is interposed between the locking member and the base so that when the lever member is moved to the rear position the locking member is automatically moved to the retracted position.

4. The mounting assembly of claim 1 wherein the plate has a pair of downwardly and outwardly tapering sidewalls and an opposed pair of downwardly and inwardly tapered sidewalls and wherein the base border includes a pair of generally mating downwardly and inwardly tapering sides and an intermediate generally mating downwardly and outwardly tapering side with the locking member having a downwardly and inwardly tapering side and being located generally opposite the one downwardly and inwardly tapering side of the border.

References Cited

UNITED STATES PATENTS

| | | | |
|---|---|---|---|
| 717,226 | 12/1902 | Liebich | 248—346 |
| 2,060,543 | 11/1936 | White | 248—346 |
| 2,395,156 | 2/1946 | Wick | 248—23 XR |
| 2,905,427 | 9/1959 | Roeder | 248—346 |

JOHN PETO, *Primary Examiner.*

U.S. Cl. X.R.

248—11